US010375141B2

(12) United States Patent
Lee

(10) Patent No.: US 10,375,141 B2
(45) Date of Patent: *Aug. 6, 2019

(54) METHOD FOR PROCESSING URL AND ASSOCIATED SERVER AND NON-TRANSITORY COMPUTER READABLE STORAGE MEDIUM

(71) Applicant: Synology Incorporated, Taipei (TW)

(72) Inventor: Yi-Chien Lee, Taipei (TW)

(73) Assignee: Synology Incorporated, Taipei (TW)

( * ) Notice: Subject to any disclaimer, the term of this patent is extended or adjusted under 35 U.S.C. 154(b) by 864 days.

This patent is subject to a terminal disclaimer.

(21) Appl. No.: 14/324,084

(22) Filed: Jul. 4, 2014

(65) Prior Publication Data

US 2015/0237107 A1 Aug. 20, 2015

(30) Foreign Application Priority Data

Feb. 18, 2014 (TW) ............................ 103105358 A

(51) Int. Cl.
*G06F 7/00* (2006.01)
*H04L 29/08* (2006.01)
*G06F 16/185* (2019.01)
*G06F 21/31* (2013.01)

(52) U.S. Cl.
CPC ............ *H04L 67/02* (2013.01); *G06F 16/185* (2019.01); *G06F 21/31* (2013.01); *H04L 67/2895* (2013.01); *G06F 2221/2105* (2013.01)

(58) Field of Classification Search
USPC .......................................................... 707/807
See application file for complete search history.

(56) References Cited

U.S. PATENT DOCUMENTS 5,845,070 A 12/1998 Ikudome
6,907,463 B1 * 6/2005 Kleinpeter, III ........ H04L 67/06 709/204
8,613,039 B2 * 12/2013 Chen ..................... G06F 16/972 726/1
2004/0073786 A1 4/2004 O'Neill
(Continued)

FOREIGN PATENT DOCUMENTS

CN 101729597 A 6/2010
CN 101739405 A 6/2010
(Continued)

OTHER PUBLICATIONS

Silver Moon, An overview of apache mpms and php server apis, Jun. 7, 2013, pp. 1-7, XP055212590, BinaryTides, URL: https://web.archive.org/web/20131226000529/http://www.binarytides.com/apache-mpm-php-server-api.
(Continued)

*Primary Examiner* — Eliyah S. Harper
(74) *Attorney, Agent, or Firm* — Steven & Showalter, LLP

(57) ABSTRACT

A server includes a processor and a storage unit, where the storage unit stores a program code, and when the processor executes the program code, the processor performs the following steps: receiving a URL from a device external to the server; determining whether the URL has a user account, and converting the URL to a file path; when the URL has the user account, utilizing a first PHP mode to execute the file path; and when the URL does not have the user account, utilizing a second PHP mode to execute the file path.

17 Claims, 3 Drawing Sheets

(56) References Cited

U.S. PATENT DOCUMENTS

| | | | | | |
|---|---|---|---|---|---|
| 2005/0114335 | A1* | 5/2005 | Wesinger, Jr. | G06Q 30/0623 | |
| 2006/0026237 | A1* | 2/2006 | Wang | H04L 51/04 | 709/206 |
| 2006/0036951 | A1 | 2/2006 | Marion | | |
| 2010/0094891 | A1* | 4/2010 | Noyes | G06F 17/30864 | 707/759 |
| 2011/0231397 | A1* | 9/2011 | Van Megchelen | H04L 61/3025 | 707/736 |
| 2013/0074148 | A1* | 3/2013 | Van Megchelen | G06F 17/30887 | 726/2 |
| 2013/0167208 | A1* | 6/2013 | Shi | H04L 63/18 | 726/5 |
| 2013/0179337 | A1* | 7/2013 | Ochynski | G06Q 40/02 | 705/40 |
| 2014/0258346 | A1* | 9/2014 | Meltzer | G06F 16/16 | 707/822 |
| 2014/0258349 | A1* | 9/2014 | Meltzer | G06F 16/183 | 707/827 |

FOREIGN PATENT DOCUMENTS

| | | | |
|---|---|---|---|
| EP | 1 404 056 | A2 | 3/2004 |
| GB | 2464397 | A | 4/2010 |
| TW | 504623 | | 10/2002 |

OTHER PUBLICATIONS

T. Berners-Lee et al., "Uniform Resource Locators (URL)", Network Working Group, Request for Comments: 1738, Category: Standards Track, Dec. 1994.

* cited by examiner

METHOD FOR PROCESSING URL AND ASSOCIATED SERVER AND NON-TRANSITORY COMPUTER READABLE STORAGE MEDIUM

BACKGROUND OF THE INVENTION

1. Field of the Invention

The present invention relates to a server, and more particularly, to a server that supports two different Hypertext Preprocessor (PHP) modes, and determines to execute which one of the two PHP modes by determining whether a received uniform resource locator (URL) has a user account or not.

2. Description of the Prior Art

A PHP module of a conventional server, such as a module "mod_php" of Apache HTTP server, uses a single execution identity (effective user identity, EUID) and an effective group identity (EGID) to execute a PHP request. Therefore, when many users share a server, and if a program stored in the server by a user account has security issues (e.g. a malicious file was written into the server), the security of the files of the other users may be influenced.

Prior art techniques provide some methods to solve the above-mentioned problem. According to one prior art technique, an executing module PHP-FPM (FastCGI Process Manager) is used to assign the execution identity by referring to the request path (e.g. document catalog/path under different user accounts) . However, this technique needs to prepare pools corresponding to all the executing identities before processing the request, and it is not allowed to assign the execution identity dynamically. For example, assuming that there are one thousand users open the personal web stations in the server, in order to have the independent execute identities, the server needs to assign one thousand pools to PHP-FPM; and once the situations of the users been added or cancelled, PFP-FPM needs to restart. In light of above, PFP-FPM is not suitable for home directory web server.

In addition, according to another prior art technique, another

PHP executing module "suPHP" is used to dynamically assign the execution identity by referring to the owner of the file/document. However, because suPHP requires additional security checking and decision logic steps while executing the request, so the efficiency of suPHP is much less than that of PFP-FPM.

To have the security and efficiency, a reverse proxy server is provided to transfer the request to a suPHP web server or a PHP-FPM web server. However, this technique needs two web servers and one reverse proxy server, that is needs more hardware resources, and addition delay time occurs when the data is transferred between different servers.

SUMMARY OF THE INVENTION

It is therefore an objective of the present invention to provide a server, which supports two different Hypertext Preprocessor (PHP) modes and determines to execute which one of the two PHP modes by determining whether a received uniform resource locator (URL) has a user account or not, to solve the above-mentioned problems.

According to one embodiment of the present invention, a server comprises a processor and a storage unit, where the storage unit stores a program code, and when the processor executes the program code, the processor performs the following steps: receiving a URL from a device external to the server; determining whether the URL has a user account, and converting the URL to a file path; when the URL has the user account, utilizing a first PHP mode to execute the file path; and when the URL does not have the user account, utilizing a second PHP mode to execute the file path.

According to another embodiment of the present invention, an non-transitory computer readable storage medium is provided, where the non-transitory computer readable storage medium is stored in a server and stores a program code, and following steps are performed when the program code is executed by a processor: receiving a URL from a device external to the server; determining whether the URL has a user account, and converting the URL to a file path; when the URL has the user account, utilizing a first PHP mode to execute the file path; and when the URL does not have the user account, utilizing a second PHP mode to execute the file path.

According to another embodiment of the present invention, a method for processing a URL is provided, the method is applied in a server, the URL is from a device external to the server, and the method comprises: determining whether the URL has a user account, and converting the URL to a file path; when the URL has the user account, utilizing a first PHP mode to execute the file path; and when the URL does not have the user account, utilizing a second PHP mode to execute the file path.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
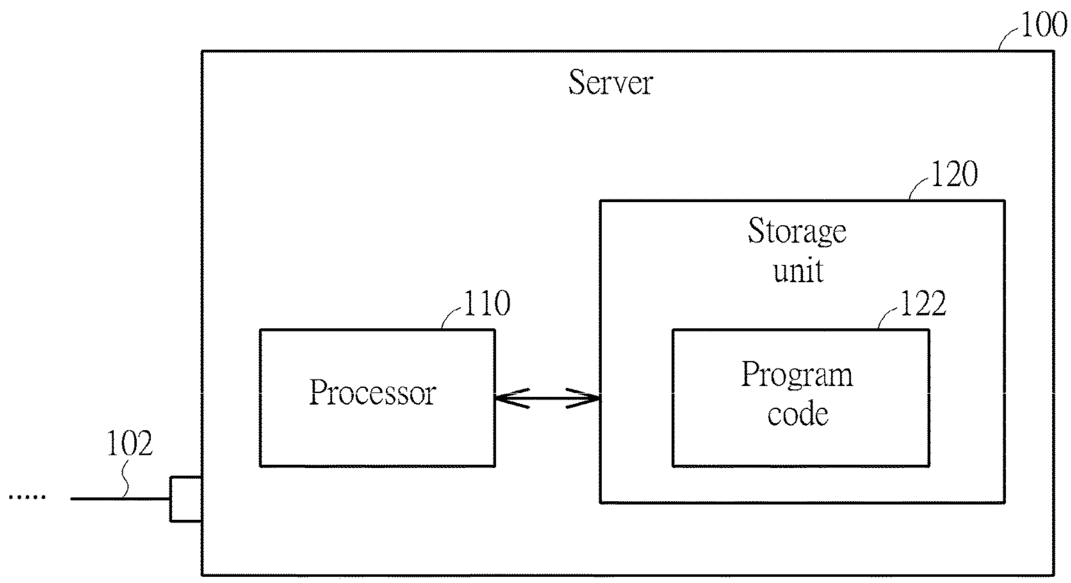
FIG. 1 is a diagram illustrating a server according to one embodiment of the present invention.

Please refer to FIG. 1, which is a diagram illustrating a server 100 according to one embodiment of the present invention. As shown in FIG. 1, the server 100 includes a processor 110 and a storage unit 120, where the storage unit 120 includes a program code 122, and the program code 122 may include at least a portion of a web server software (e.g. Apache, but not a limitation). The contents of the program code 122 mentioned above is for illustrative purposes only, and is not a limitation of the present invention. In addition, the server 100 connects to network via a network cable 102 to communicate with external electronic devices. In this embodiment, the server 100 is a web server, and the server 100 is used to receive a URL transmitted from a user device, that is to receive a HyperText Transfer Protocol (HTTP) requested, and to execute the URL to provide a HTTP response to the user device.

Figure 2:
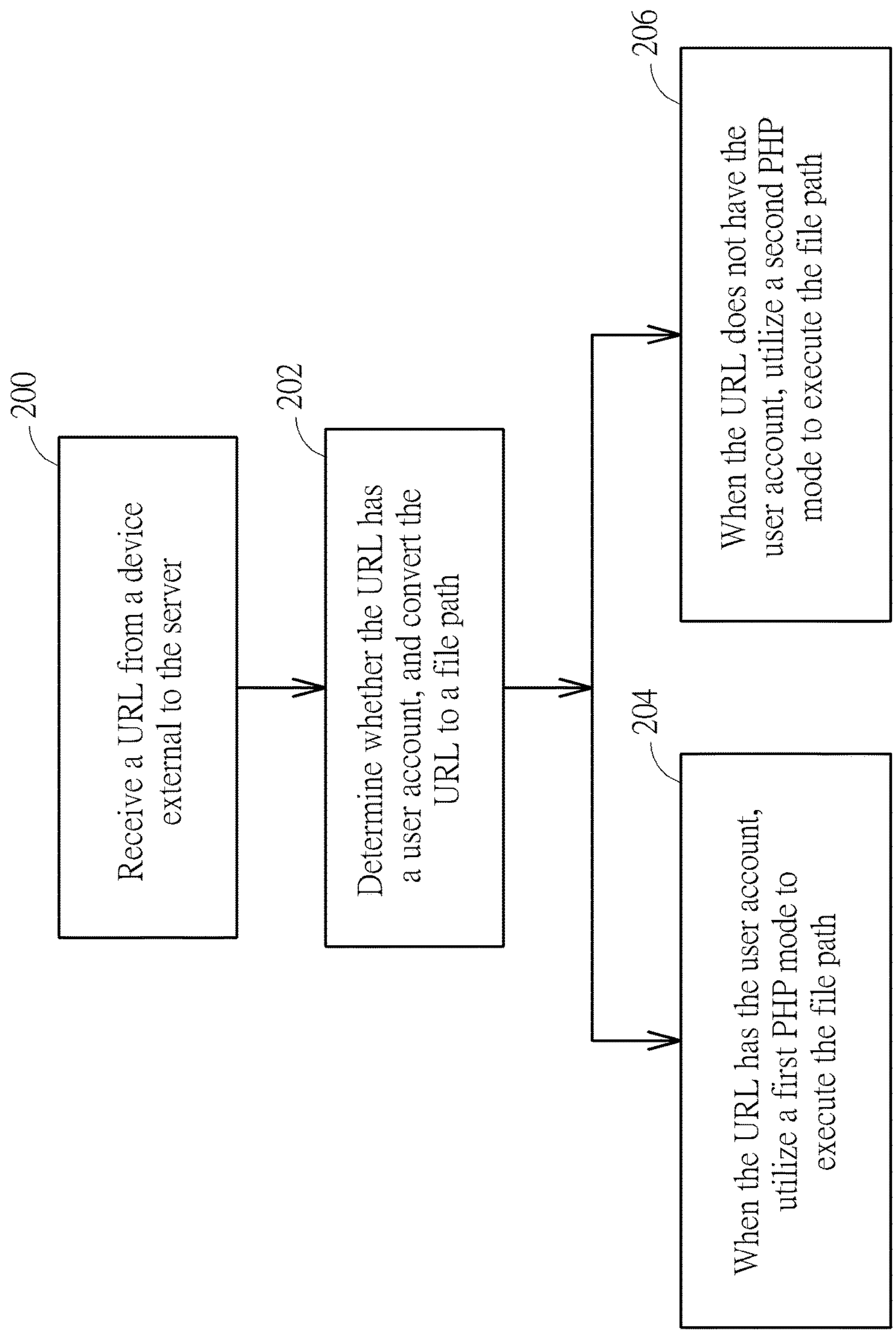
FIG. 2 shows the steps when the program code is executed by the processor.

Please refer to FIG. 2, which shows the steps when the program code 112 is executed by the processor 110. Referring to FIG. 2, the steps are as follows:

Step 200: receive a URL from a device external to the server.

Step 202: determine whether the URL has a user account, and convert the URL to a file path.

Step 204: when the URL has the user account, utilize a first PHP mode to execute the file path.

Step 206: when the URL does not have the user account, utilize a second PHP mode to execute the file path.

Figure 3:
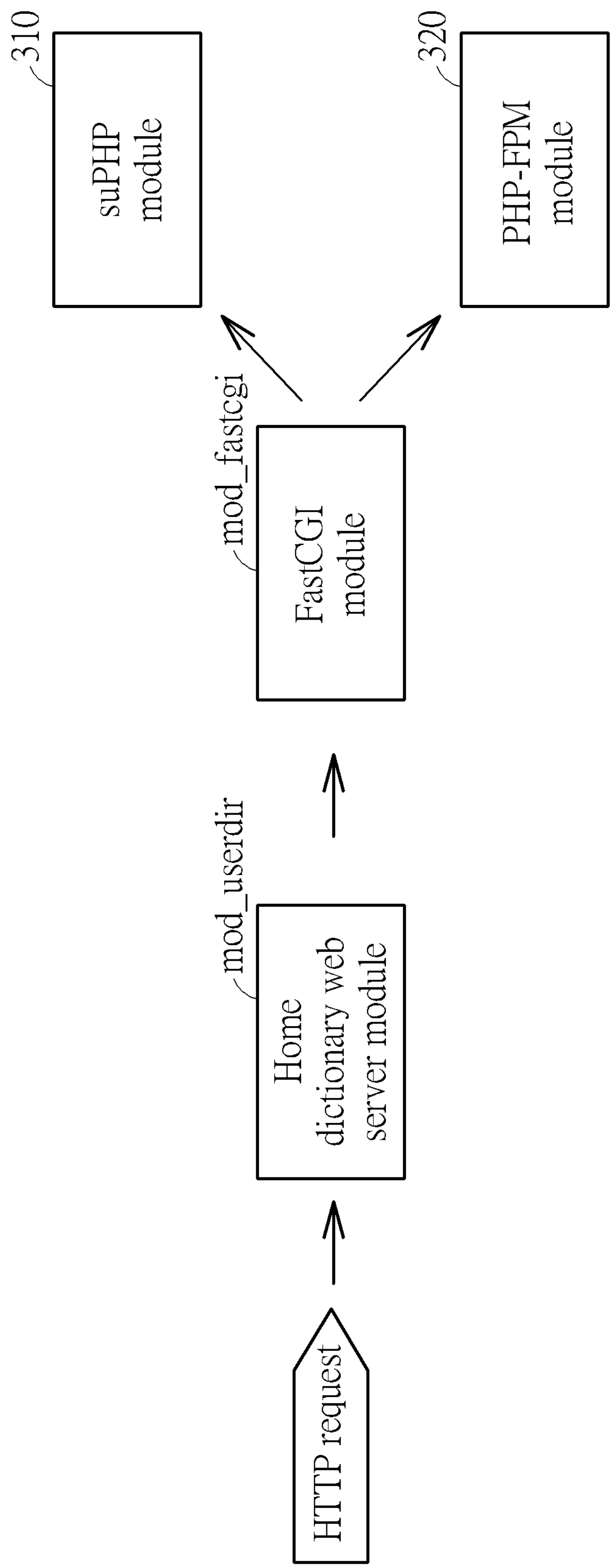
FIG. 3 is a diagram illustrating the program code of the server processing the received URL.

Please refer to FIG. 3, which is a diagram illustrating the program code 122 of the server 100 processing the received URL, where the home dictionary web server module mod_userdir, Fast Common Gateway Interface (FastCGI) module mod_fastcgi, suPHP module 310 and PHP-FPM module 320 are the program modules within the program code 122.

For the detailed operations of the embodiment shown in FIG. 3, first, the home directory web server module mod_userdir receives a HTTP request from a user device, where the HTTP request is generated from a web browser of an electronic device (e.g. computer, cell phone or tablet PC . . . etc.) in user side, and the HTTP request is transmitted to the server 100 via the network cable 102, and the HTTP request includes a URL. After receiving the URL, the home directory web server module mod_userdir determines whether the URL has a user account or not. In detail, assuming that the URL is http://DiskStation/~ken/Sone.php, the home directory web server module mod_userdir will determine whether the URL has the user account or not by determining whether the URL has an identification symbol (e.g. "~" in this embodiment) or not. In this embodiment, because the URL http://DiskStation/~ken/Sone.php has the identification symbol "~", the home directory web server module mod_userdir will determine that the URL has the user account, and enable the suPHP module 310 under the home directory web server module mod_userdir and set the corresponding processing steps. In this embodiment, the home directory web server module mod_userdir has two parameters: suPHP_Engine and suPHP_AddHandler, where the parameter suPHP_Engine is used to set to enable or disable the suPHP module 310, and the parameter suPHP_AddHandler is used to set the processing steps of the assigned PHP module (e.g. PHP-CGI module, but it is not a limitation of the present invention). When the URL has the user account, both the above-mentioned two parameters, suPHP_Engine and suPHP_AddHandler, are enabled. It is noted that the above-mentioned disclosure about determining whether the URL has the user account or not by determining whether the URL has the identification symbol is for illustrative purposes only, and not a limitation of the present invention.

Besides determining whether the URL has the user account, the home directory web server module mod_userdir will convert the URL to a file path. Assuming that the URL is http://DiskStation/~ken/Sone.php, the home directory web server module mod_userdir will convert this URL to the file path: /var/services/homes/ken/www/Sone.php. In detail, because the URL has the user account "ken", the home directory web server module mod_userdir can convert the URL to the above file path according to the user account and a base path. For example, if the URL has the user account, the base path can be a home directory path: /var/services/homes/*/www/ (not a limitation of the present invention). After converting the URL to the file path according to the user account and the base path, the home directory web server module mod_userdir further transmits the file path to the FastCGI module mod_fastcgi and the suPHP module 310. After receiving the file path, the suPHP module 310 will try to read the real file path (e.g. /volume1/homes/ken/www/Sone.php), and obtain information about the file owner and execute "Sone.php " by using the user identity (UID) or group identity (GID). In another embodiment of the present invention, the home directory web server module mod_userdir can transmit the file path to the suPHP module 310 via a proxy FastCGI module mod_proxy_fcgi.

In one embodiment, when the suPHP module 310 receives the file path mentioned above, the suPHP module 310 may convert the file path to the real file path via a get real path module (e.g. but not limit to, the module getRealPath). After the suPHP module 310 obtain the real file path corresponding to the above file path (e.g. the above-mentioned /volume1/homes/ken/www/Sone.php), the suPHP module 310 may use a path match module (e.g. but not limit to, the module PathMatcher) to determine whether the real file path is allowed to execute PHP or not. In this embodiment, the module PathMatcher may determine whether the real file path is allowed to execute PHP or not by determining whether the real file path has a matched characteristic parameter. In detail, if the real file path is /volume1/homes/ken/www/Sone.php, the characteristic parameter can be set as (^/volume\d+/homes/.+/www/) to make the path match module able to determine whether the real file path matches the mode of the characteristic parameter to further determine whether the real file path is an allowed file path. Therefore, the server 100 of this embodiment does not need to provide a list describing file paths allowed to execute PHP within the profile, and the server 100 allows the user home directory to be stored in any serviceable disk volume. Therefore, when moving the data of the disk volume having the home directory or adding new directory, the profile of suPHP may not need to be modified, and suPHP can keep working without restarting.

The above example is for the URL having the user account, in another example of the present invention, assuming that the URL is http://DiskStation/SDSN.php, because the URL does not have the identification symbol "~", the home directory web server module mod_userdir will determine that the URL does not have the user account, and does not enable the suPHP module 310 under the home directory web server module mod_userdir and not set the corresponding processing steps (in this embodiment, defaults of two parameters, suPHP_Engine and suPHP_AddHandler, are disabled). In addition, the home directory web server module mod_userdir will convert the URL to a file path: /var/services/web/SNSD.php. In detail, because the URL does not have the user account, the home directory web server module mod_userdir will convert the URL to the above file path according to the user account and a base path. For example, if the URL does not have the user account, the base path can be a system directory path: /var/services/web/ (not a limitation of the present invention). After converting the URL to the file path according to the base path, the home directory web server module mod_userdir further transmits the file path to the FastCGI module mod_fastcgi and the PHP-FPM module 320. After receiving the file path, the PHP-FPM module 320 immediately execute "SNSD.php" by using a predetermined execution identity, that is the PHP-FPM module 320 does not execute "Sone.php" by using the user identity (UID) or group identity (GID) corresponding to the user account. In another embodiment of the present invention, the home directory web server module mod_userdir can transmit the file path to the PHP-FPM module 320 via a proxy FastCGI module mod_proxy_fcgi.

In the above embodiments, because both the suPHP module 310 and the PHP-FPM module 320 are operated under the Common Gateway Interface (CGI), so the above embodiments can be implemented by modifying the profile of the home directory web server module mod_userdir, and selectively transmitting the file path to the suPHP module 310 or the PHP-FPM module 320 via the FastCGI module mod_fastcgi, so as to execute two PHP modes within a single server.

In another embodiment of the present invention, the PHP-FPM module 320 can be replace by any other PHP module having no security checking process, such as PHP-CGI module. This alternative design shall fall within the scope of the present invention.

In another embodiment of the present invention, the server 100 may comprise the processor 110 and a non-transitory computer readable medium (not shown), where the non-transitory computer readable medium stores the program code 122. When the processor 110 executes the program code 122, the processor 110 will perform the steps described in the above-mentioned embodiments. This alternative design shall fall within the scope of the present invention.

It is noted that the above-mentioned examples about URL, file path and profile are for illustrative purposes only, and are not meant to be limitations of the present invention. As long as two PHP modes can be switched within a single server by determining whether the URL has the user account or not, all the alternative designs shall fall within the scope of the present invention.

The above embodiments have the following advantages: (1) because the program codes under the home directory (/var/services/homes/*/www/) and system directory (/var/services/web/) are rendered different authority by referring to different file system access authority and user identities, the security is better; (2) compared with the conventional PHP module, less memory is required, so the embodiments of the present invention are suitable for the system with limited resources; (3) All the operations can be processed within a single server, and the data is not needed to be transmitted between different servers, therefore the system efficiency and stability are improved.

In light of above, in the present invention, two PHP modes can be switched within a single server, that is the suPHP module having better security and the PHP-FPM module having better efficiency. Therefore, the present invention can dynamically execute different PHP modes by referring to the practical requirement, and the hardware cost is lowered.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A web server comprising a processor and a storage unit, wherein the storage unit stores at least a web server program module, a first Hypertext Preprocessor (PHP) program module, and a second PHP program module; and when the processor executes the web server program module, the processor performs the following steps of:

receiving, by the web server program module, a Uniform Resource Locator (URL) from a device external to the web server, wherein the URL at least comprises a domain name;

determining, by the web server program module, whether the URL received by the web server program module further includes any user account therein or not, and converting the URL received by the web server program module to a file path, wherein said any user account is not a part of the domain name;

when the web server program module determines that the URL received by the web server program module has a user account therein, utilizing the first PHP program module to execute the file path; and when the web server program module determines that the URL received by the web server program module does not have any user account therein, utilizing the second PHP program module different from the first PHP program module to execute the file path;

wherein the first PHP program module and the second PHP program module are executed by the processor within the web server.

2. The web server of claim 1, wherein the steps of when the URL has the user account, utilizing the first PHP program module to execute the file path; and when the URL does not have any user account, utilizing the second PHP program module to execute the file path comprises:

when the URL has the user account, transmitting the file path to the first PHP program module via a common gateway interface module to execute the file path; and when the URL does not have any user account, transmitting the file path to the second PHP program module via the common gateway interface module to execute the file path.

3. The web server of claim 1, wherein the steps of when the URL has the user account, utilizing the first PHP program module to execute the file path; and when the URL does not have any user account, utilizing the second PHP program module to execute the file path comprises:

when the URL has the user account, utilizing the first PHP program module and utilizing a user identity (UID) or a group identity (GID) to execute the file path; and when the URL does not have any user account, utilizing the second PHP program module and utilizing a predetermined execution identity, instead of using any UID or GID corresponding to the user account, to execute the file path.

4. The web server of claim 1, wherein the first PHP program module is a suPHP program module.

5. The web server of claim 4, wherein the second PHP program module is a PHP-FPM program module.

6. A non-transitory computer readable medium, positioned in a web server and storing at least a web server program module, a first Hypertext Preprocessor (PHP) program module and a second PHP program module, wherein when the web server program module is executed by a processor, the following steps are performed:

receiving, by the web server program module, a Uniform Resource Locator (URL) from a device external to the web server;

determining, by the web server program module, whether the URL received by the web server program module has any user account therein or not, and converting the URL to a file path;

when the web server program module determines that the URL received by the web server program module has a user account therein, utilizing the first PHP program module to execute the file path; and when the web server program module determines that the URL received by the web server program module does not have any user account therein, utilizing the second PHP program module different from the first PHP program module to execute the file path;

wherein the first PHP program module and the second PHP program module are executed by the processor within the web server, and the steps of utilizing the first PHP program module to execute the file path and utilizing the second PHP program module to execute the file path comprises:

when the URL has the user account, utilizing the first PHP program module and utilizing a user identity (UID) or a group identity (GID) to execute the file path; and when the URL does not have any user account, utilizing the second PHP program module and utilizing a predetermined execution identity, instead of using any UID or GID corresponding to the user account, to execute the file path.

7. The non-transitory computer readable medium of claim 6, wherein the steps of when the URL has the user account, utilizing the first PHP program module to execute the file path; and when the URL does not have any user account, utilizing the second PHP program module to execute the file path comprises:

when the URL has the user account, transmitting the file path to the first PHP program module via a common gateway interface module to execute the file path; and when the URL does not have any user account, transmitting the file path to the second PHP program module via the common gateway interface module to execute the file path.

8. The non-transitory computer readable medium of claim 6, wherein the first PHP program module is a suPHP program module.

9. The non-transitory computer readable medium of claim 8, wherein the second PHP program module is a PHP-FPM program module.

10. A method for processing a Uniform Resource Locator (URL), wherein the method is applied in a web server, the URL is from a device external to the web server, the web server stores at least a web server program module, a first Hypertext Preprocessor (PHP) program module and a second PHP program module, the web server program module is executed by a processor of the web server, and the method comprises:

determining, by the web server program module, whether the URL received by the web server program module has any user account therein or not, and converting the URL to a file path;

when the web server program module determines that the URL received by the web server program module has a user account therein, utilizing the first PHP program module to execute the file path; and when the web server program module determines that the URL received by the web server program module does not have any user account therein, utilizing the second PHP program module different from the first PHP program module to execute the file path;

wherein the first PHP program module and the second PHP program module are executed by the processor within the web server, and the steps of utilizing the first PHP program module to execute the file path and utilizing the second PHP program module to execute the file path comprises:

when the URL has the user account, utilizing the first PHP program module and utilizing a user identity (UID) or a group identity (GID) to execute the file path; and when the URL does not have any user account, utilizing the second PHP program module and utilizing a predetermined execution identity, instead of using any UID or GID corresponding to the user account, to execute the file path.

11. The method of claim 10, wherein the steps of when the URL has the user account, utilizing the first PHP program module to execute the file path; and when the URL does not have any user account, utilizing the second PHP program module to execute the file path comprises:

when the URL has the user account, transmitting the file path to the first PHP program module via a common gateway interface module to execute the file path; and when the URL does not have any user account, transmitting the file path to the second PHP program module via the common gateway interface module to execute the file path.

12. The method of claim 10, wherein the first PHP program module is a suPHP program module.

13. The method of claim 12, wherein the second PHP program module is a PHP-FPM program module.

14. The web server of claim 1, wherein the step of determining whether the URL has any user account therein or not comprises:

determining whether the URL has an identification symbol therein or not, wherein the identification symbol is "~";

when the URL has the identification symbol, determining that the URL has the user account; and when the URL does not have the identification symbol, determining that the URL does not have any user account.

15. The non-transitory computer readable medium of claim 6, wherein the step of determining whether the URL has any user account therein or not comprises:

determining whether the URL has an identification symbol therein or not, wherein the identification symbol is "~";

when the URL has the identification symbol, determining that the URL has the user account; and when the URL does not have the identification symbol, determining that the URL does not have any user account.

16. The method of claim 10, wherein the step of determining whether the URL has any user account therein or not comprises:

determining whether the URL has an identification symbol therein or not, wherein the identification symbol is "~";

when the URL has the identification symbol, determining that the URL has the user account; and when the URL does not have the identification symbol, determining that the URL does not have any user account.

17. The web server of claim 1, wherein a slash character "/" is placed between the domain name and the user account.

* * * * *